(12) United States Patent
Gretz (10) Patent No.: US 7,531,745 B1
(45) Date of Patent: May 12, 2009

(54) BLANK COVER ASSEMBLY FOR UNUSED OUTLET BOX

(75) Inventor: Thomas J. Gretz, Clarks Summit, PA (US)

(73) Assignee: Arlington Industries, Inc, Scranton, PA (US)

( * ) Notice: Subject to any disclaimer, the term of this patent is extended or adjusted under 35 U.S.C. 154(b) by 0 days.

(21) Appl. No.: 12/077,224

(22) Filed: Mar. 18, 2008

(51) Int. Cl.
*H02G 3/14* (2006.01)

(52) U.S. Cl. .......................... 174/66; 174/67; 220/241; 439/538; D8/353; D13/177

(58) Field of Classification Search .................. 174/66, 174/67, 135; 220/241, 242; 312/328, 229; 439/538, 136, 143–147, 536, 539
See application file for complete search history.

(56) References Cited

U.S. PATENT DOCUMENTS

| | | | |
|---|---|---|---|
| 3,386,071 A | 5/1968 | Allen | |
| 5,003,128 A | 3/1991 | Grondin | |
| 5,285,014 A | 2/1994 | Gilchrist | |
| 6,608,253 B1* | 8/2003 | Rintz | 174/66 |
| 6,750,398 B1 | 6/2004 | Richardson | |
| 6,761,582 B1 | 7/2004 | Shotey et al. | |
| 6,943,297 B2* | 9/2005 | Capella | 174/66 |
| 7,230,182 B1* | 6/2007 | Gates | 174/66 |
| 7,279,637 B1* | 10/2007 | O'Young et al. | 174/66 |

* cited by examiner

*Primary Examiner*—Dhiru R Patel (57) ABSTRACT

A blank cover assembly for covering an electrical box. The blank cover assembly includes a mounting plate and a cover plate. Wide slots are provided in the mounting plate for receipt of fasteners for securing it to the electrical box. Openings in the mounting plate are capable of receiving posts from the cover plate for securing the cover plate over the electrical box. The cover plate is simply pressed onto the mounting plate in order to secure it thereto. The blank cover assembly provides a paintable blank cover that is free of visible fasteners and that blends easily with the wall to provide a convenient device for covering empty or unused electrical boxes.

16 Claims, 8 Drawing Sheets

BLANK COVER ASSEMBLY FOR UNUSED OUTLET BOX

FIELD OF THE INVENTION

This invention relates to unused electrical outlet boxes and specifically to a blank cover assembly for covering an unused electrical box.

BACKGROUND OF THE INVENTION

In newly constructed houses, electrical boxes on interior walls are frequently left empty. Typically, the houses are outfitted with electrical boxes that are pre-wired for components that will later be added by the homeowner, such as surround sound systems or electrical outlets. In existing buildings, electrical service is sometimes deemed unnecessary in some areas and electrical components are removed thereby creating unused electrical boxes. In each of these cases, there is an empty or unused electrical box that is unsightly if left uncovered and is also a potential hazard if live electrical wires remain in the box.

Typically these empty and unused electrical boxes are covered by a conventional blank cover plate that is available commercially. The blank cover plate includes apertures that match up with the threaded bores in the conventional electrical box. An installer typically inserts two screws through the apertures in the blank plate and thereby secures the plate to the threaded bores in the electrical box.

Although conventional blank cover plates cover the opening of an electrical box, they are unsightly as a result of the visible screws. Additionally, if the existing electrical box is not square with the wall, installing the blank cover with the screws will result in a blank cover that is skewed in the same manner as the underlying electrical box.

What is needed therefore is a blank cover that can be secured to an empty or unused electrical box with a minimal amount of effort. The cover should be a completely blank cover, without screws or any other fasteners visible to an observer. Additionally, the blank cover should be capable of being easily removed at a later date when it is desired to mount an electrical component in the underlying electrical box. The blank cover preferably would be of simple design and capable of being manufactured at low unit cost. Furthermore, the blank cover should be capable of receiving paint to enable it to be painted the same color as the wall it is mounted on to enable it to blend in visually with the wall and thereby provide an aesthetically pleasing solution to an empty or unused electrical box.

SUMMARY OF THE INVENTION

The invention is a blank cover assembly for covering an electrical box. The blank cover assembly includes a mounting plate and a cover plate. Wide slots are provided in the mounting plate for receipt of fasteners for securing to the electrical box. Openings in the mounting plate are capable of receiving posts from the cover plate for securing the cover plate over the electrical box. The cover plate is simply pressed onto the mounting plate in order to secure it thereto. The blank cover assembly provides a paintable blank cover that is free of visible fasteners and therefore blends easily with the wall.

OBJECTS AND ADVANTAGES

Several advantages are achieved with the blank cover assembly of the present invention, including:

(1) The blank cover assembly provides a convenient device for covering an empty or unused electrical box so that it blends in with the wall and is substantially hidden to the observer.
(2) The blank cover assembly provides a completely blank cover for an electrical box, without screws or any other fasteners visible to an observer.
(3) The blank cover assembly requires only two pieces, a mounting plate and a cover plate to blank off an empty or unused electrical box.
(4) The blank cover assembly accepts paint and can therefore be painted to further blend the installed cover in with a wall.
(5) The blank cover assembly is easy to place in use by securing a mounting plate to an electrical box and simply pressing a cover plate into the mounting plate.
(6) Wide slots in the mounting plate provide an easy means for aligning the blank cover assembly to be square with the room that is installed in. This is an important feature in covering unused electrical boxes as many unused boxes are not correctly aligned at installation or have become misaligned over the years through normal use.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | blank cover assembly, preferred embodiment |
| 22 | mounting plate |
| 24 | cover plate |
| 26 | electrical box |
| 28 | fastening arrangement |
| 30 | slot |
| 32 | fastener |
| 34 | bore in electrical box |
| 36 | U-shaped opening |
| 38 | vertical axis |
| 40 | front surface of mounting plate |
| 41 | rear surface of mounting plate |
| 42 | countersunk periphery |
| 44 | outward-directed edge |
| 46 | reinforcement rib |
| 48 | first end of U-shaped opening |
| 50 | second end of U-shaped opening |
| 52 | alignment tab |
| 54 | front face of outward-directed edge |
| 56 | rear face of outward-directed edge |
| 58 | front surface of cover plate |
| 60 | rear surface of cover plate |
| 62 | post |
| 64 | inward facing side of post |
| 66 | teeth |
| 68 | channel |
| 70 | outward facing side of post |
| 72 | arcuate periphery of cover plate |
| 74 | convex side |
| 76 | concave side |
| 78 | proximal end of post |
| 80 | distal end of post |
| 82 | wall |
| 84 | outer periphery of mounting plate |
| 86 | outer periphery of cover plate |
| D1 | distance between the teeth on the opposing posts |
| Θ1 | angle of the front face of the outward-directed edge |
| Θ2 | angle of the rear face of the outward-directed edge |

DETAILED DESCRIPTION OF THE INVENTION

Figure 1:
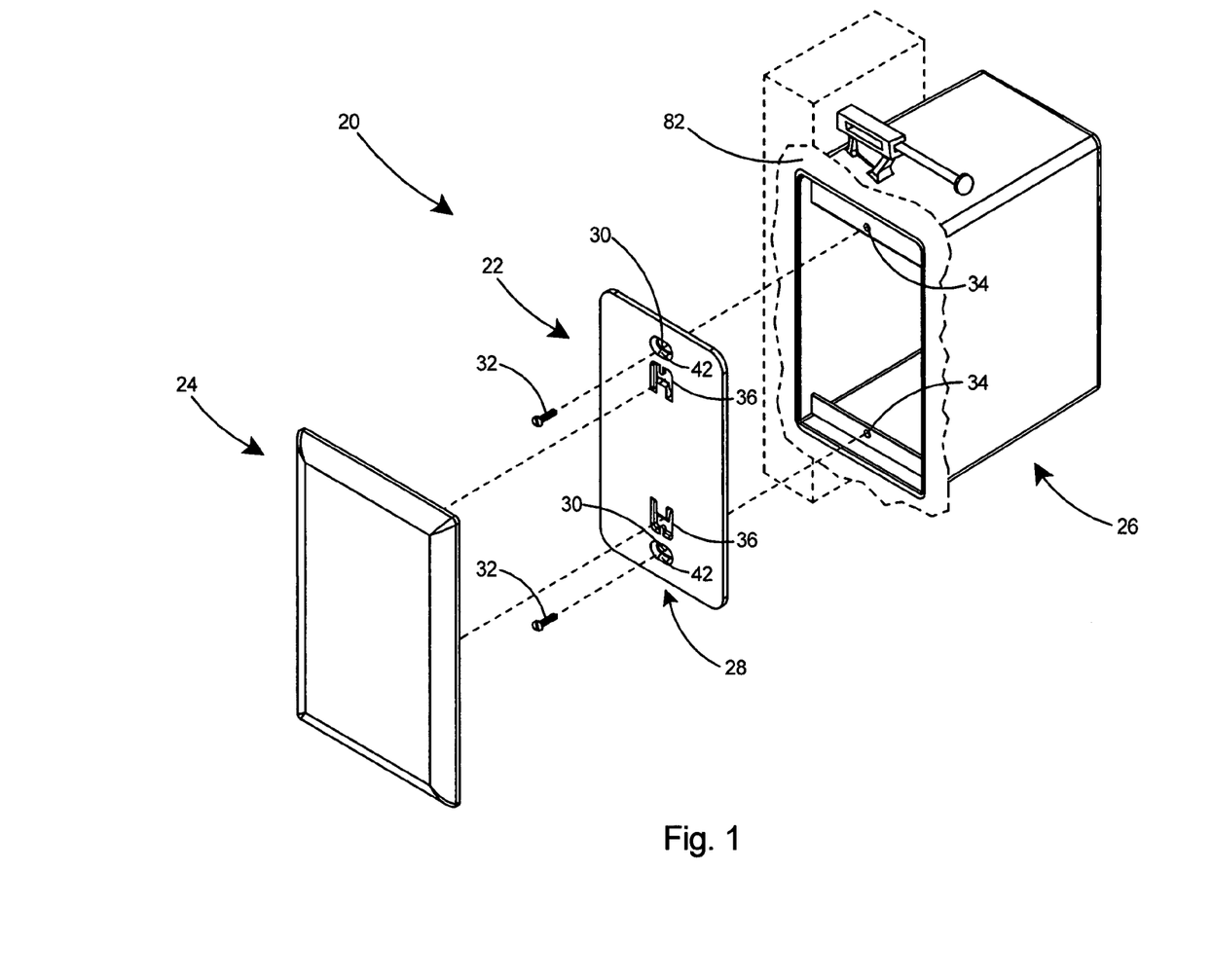
FIG. 1 is an exploded perspective view of a preferred embodiment of a blank cover assembly for an unused electrical box according to the present invention.

With reference to FIG. 1, there is shown a preferred embodiment of the present invention, a blank cover assembly 20 including a mounting plate 22 and a cover plate 24 for covering an electrical box 26. The mounting plate 22 includes a fastening arrangement 28 for securing the mounting plate 22 directly to the electrical box 26. The fastening arrangement 28 includes a pair of slots 30 in the mounting plate 22 and fasteners 32 that thread into bores 34 in the electrical box 26. As shown in FIG. 1, the slots 30 in the mounting plate 22 match the pattern and spacing of the bores 34 in the electrical box 26. In the blank cover assembly 20 of the present invention, the slots 30 in the mounting plate 22 preferably are substantially wider than the bores 34 of the electrical box 26.

Figure 2:
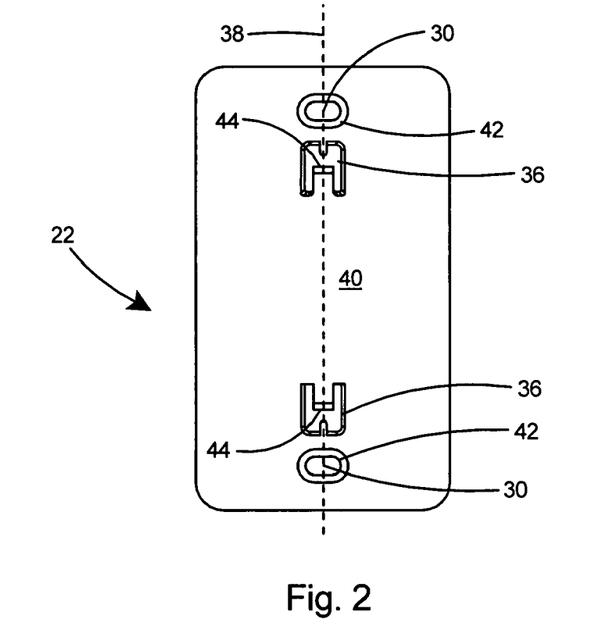
FIG. 2 is a front view of a mounting plate that forms a portion of the blank cover assembly of FIG. 1.
Figure 3:
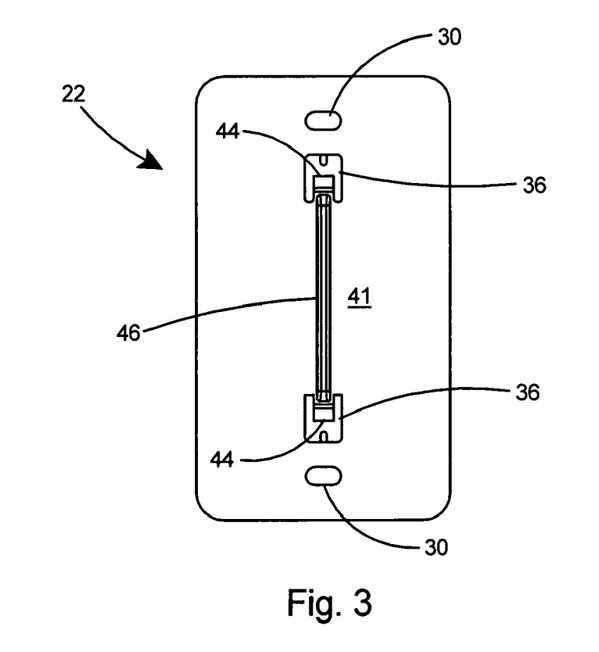
FIG. 3 is a rear view of the mounting plate depicted in FIG. 2.

Referring to FIGS. 2 and 3, the mounting plate 22 includes a pair of U-shaped openings 36 therein centered along a vertical axis 38 through the plate. The mounting plate 22 includes a front surface 40 and a rear surface 41. A countersunk periphery 42 is provided in the front surface 40 of the mounting plate 22 surrounding each of the slots 30. The U-shaped openings 36 of the mounting plate 22 each include outward-directed edges 44 facing outwardly with respect to the plate.

Figure 4:
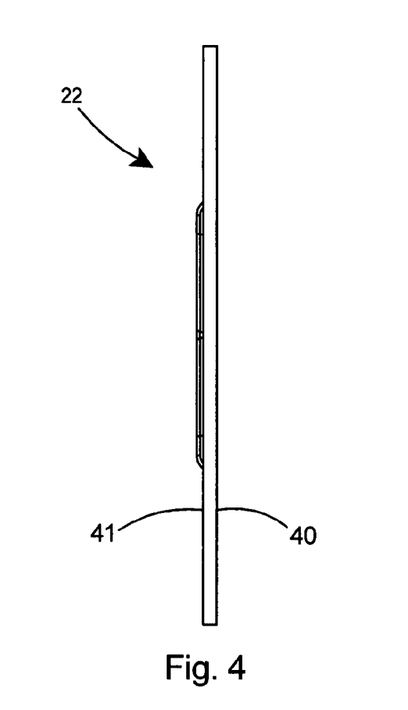
FIG. 4 is a side view of the mounting plate of FIG. 2.

With reference to FIGS. 3 and 4, the rear surface 41 of the mounting plate 22 further includes a reinforcement rib 46. The reinforcement rib 46 extends vertically between the U-shaped openings 36. As shown in FIG. 4, the front surface 40 and the rear surface 41 of the mounting plate 22 are preferably planar.

Figure 5:
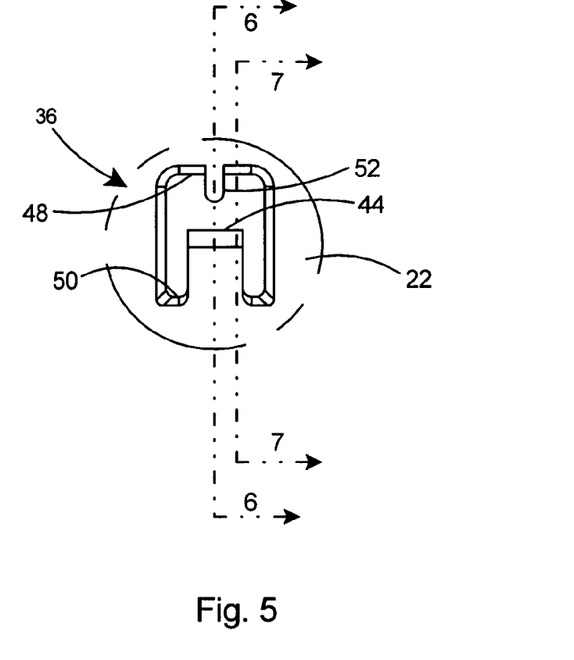
FIG. 5 is a detail view of a U-shaped opening that forms a portion of the mounting plate of FIG. 2.

As shown in FIG. 5, the U-shaped openings 36 of the mounting plate 22 include a first end 48 and a second end 50. An alignment tab 52 is provided extending from the first end 48 of each U-shaped opening 36.

Figure 6:
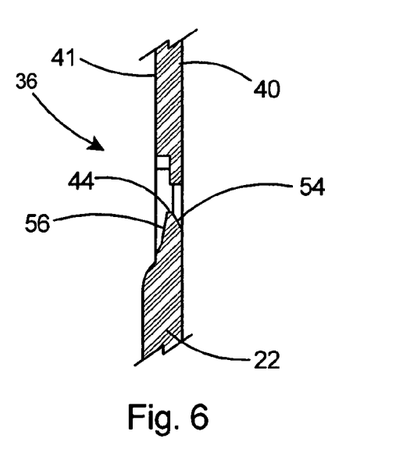
FIG. 6 is a sectional view of the U-shaped opening portion of the mounting plate taken along line 6-6 of FIG. 5.
Figure 7:
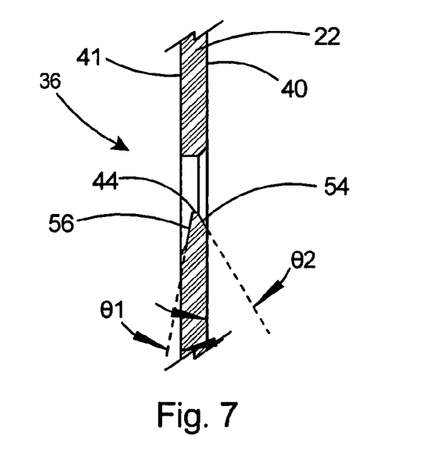
FIG. 7 is a sectional view of the U-shaped opening portion of the mounting plate taken along line 7-7 of FIG. 5.

Referring to FIGS. 6 and 7, the outward-directed edges 44 on the U-shaped openings 36 of the mounting plate 22 are angled away from the front surface 40 and the rear surface 41 to create a sharp outward-directed edge 44. The front face 54 of the outward-directed edge 44 is at an angle Θ1 with respect to the front surface 40 of the mounting plate 22 and the rear face 56 of the outward-directed edge 44 is at an angle Θ2 with respect to the rear surface 41 of the mounting plate 22. Preferably, angle Θ1 is between 5 and 15 degrees and angle Θ2 is between 25 and 35 degrees.

Figure 8:
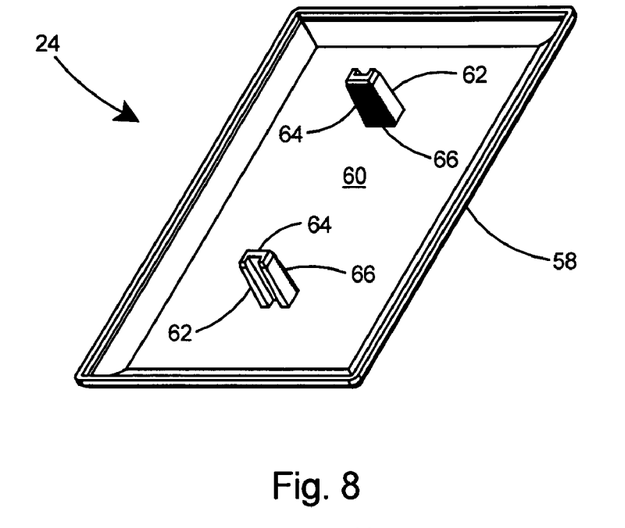
FIG. 8 is a rear perspective view of a cover plate that forms a portion of the blank cover assembly of FIG. 1.
Figure 9:
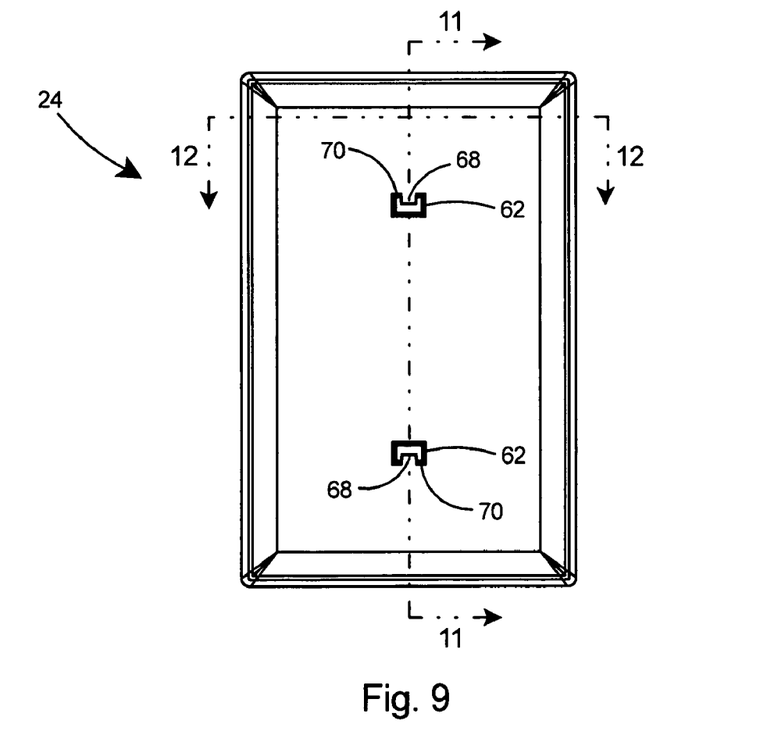
FIG. 9 is a rear view of the cover plate of FIG. 8.

With reference to FIG. 8, the cover plate 24 includes a front surface 58, a rear surface 60, and two posts 62 extending from the rear surface 60. The posts 62 include inward facing sides 64 with teeth 66 thereon. As shown in FIG. 9, the posts 62 of the cover plate 24 have a substantially U-shaped cross-section that provides an open channel 68 on the outward facing side 70 of the posts 62.

Figure 10:
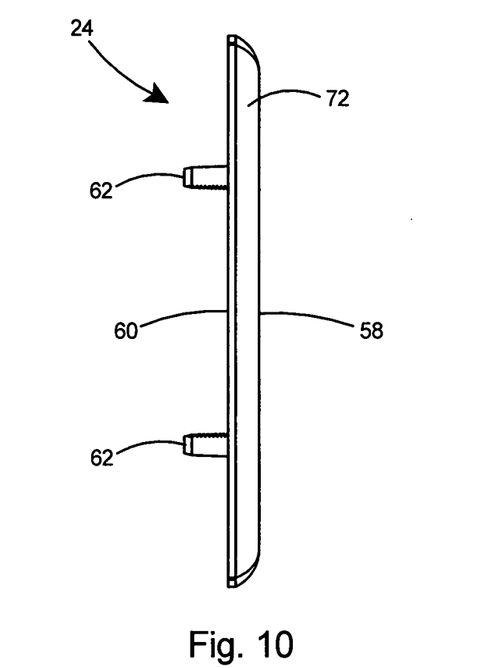
FIG. 10 is a side view of the cover plate depicted in FIG. 9.
Figure 11:
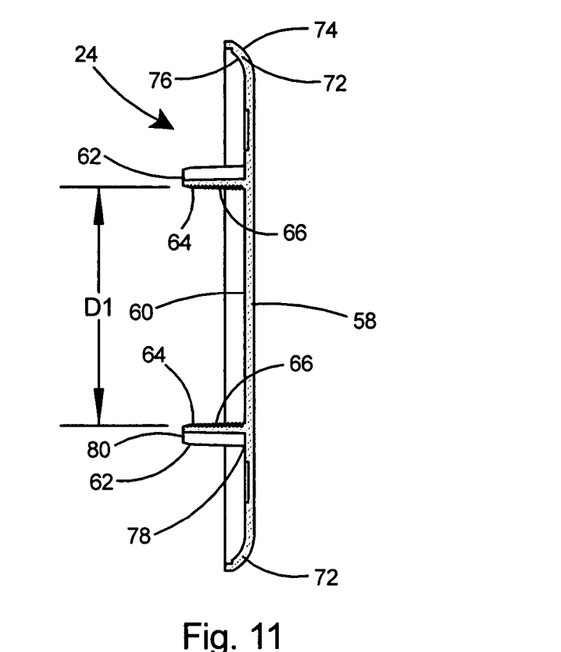
FIG. 11 is a sectional view of the cover plate taken along line 11-11 of FIG. 9.
Figure 12:
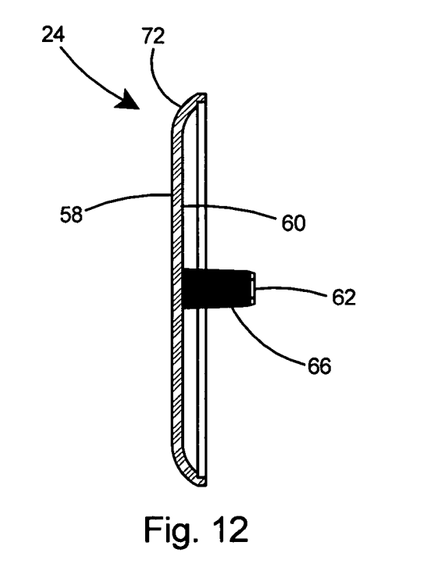
FIG. 12 is a sectional view of the cover plate taken along line 12-12 of FIG. 9.

Referring to FIGS. 10 and 11, the posts 62 are substantially perpendicular to the rear surface 60 of the cover plate 24. The cover plate 24 includes an arcuate periphery 72. The arcuate periphery 72 of the cover plate 24 includes a convex side 74 and a concave side 76, with the convex side 74 forming the outer periphery of the front surface 58 and the concave side 76 on the rear surface 60 of the cover plate 24. As shown in FIG. 11, the teeth 66 on the inward facing sides 64 of the posts 62 face each other.

Figure 13:
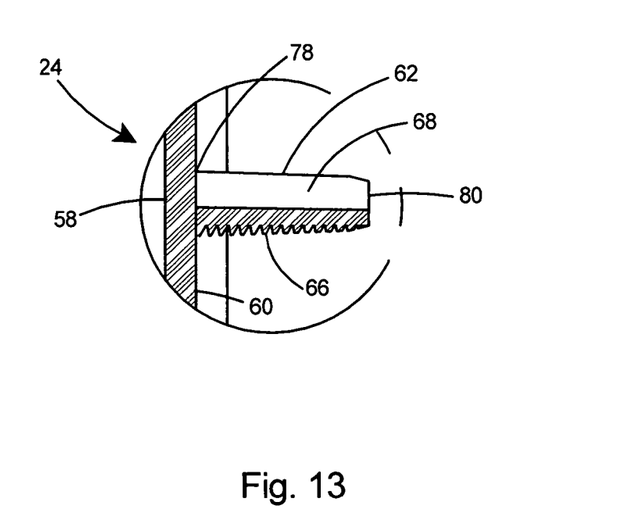
FIG. 13 is a detail view of the post portion of the cover plate of FIG. 11.

As shown in FIG. 13, the posts 62 of the cover plate 24 each include a proximal end 78 and a distal end 80. Preferably, the teeth 66 increase gradually increase in length from the distal end 80 to the proximal end 78 of the post. Therefore, as shown in FIG. 11, the distance D1 between the teeth 66 on the opposing posts 62 decreases from the distal ends 80 to the proximal ends 78.

Referring to FIG. 1, the blank cover assembly 20 of the present invention is placed in operation by first using the fastening arrangement 28 to secure the mounting plate 22 to an empty or unused electrical box 26. A significant advantage provided by the blank cover assembly 20 of the present invention is the ability to square a cover plate 24 with respect to the wall 82. In many cases, existing electrical boxes, through years of repeated use, become out of square with respect to the wall, with the vertical walls of the electrical box 26 being not exactly plumb with the wall. The blank cover assembly 20 of the present invention, as a result of the included wide slots 30 with their countersunk peripheries 42, can be twisted with respect to the out-of-square electrical box 26 until the mounting plate 22 is square with the wall 82, and then the fasteners 32 inserted in the wide slots 30 and tightened into the bores 34 in the electrical box 26 to secure the mounting plate 22 square with the wall 82. After the mounting plate 22 is secured to the electrical box 26, the cover plate 24 can be snapped onto the electrical box 26. As a result of securing the mounting plate 22 square with the wall 82, the cover plate 24 will also be square with the wall 82 when it is snapped onto the mounting plate 22.

Figure 14:
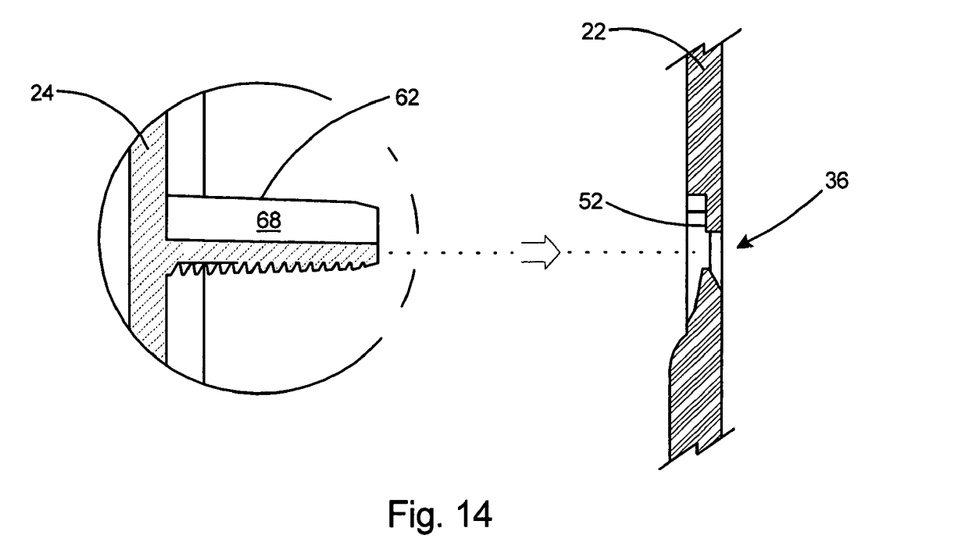
FIG. 14 is an exploded view of the post portion of the cover plate in alignment with a mounting plate to be secured thereto according to the present invention.
Figure 15:
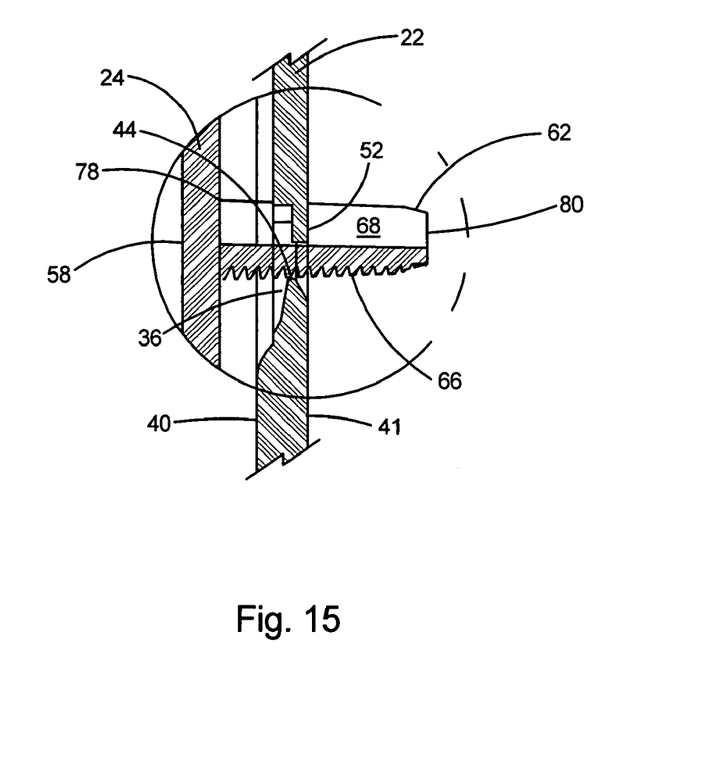
FIG. 15 is a detail view of the post portion of the cover plate after being secured to a mounting plate in the blank cover assembly of the present invention.

With reference to FIGS. 14 and 15, there is shown in FIG. 14 an exploded view of the post portion 62 of the cover plate 24 in alignment with a mounting plate 22 to be secured thereto and in FIG. 15 a view of the post portion 62 of the cover plate 24 after being secured to the mounting plate 22. The alignment tabs 52 on the mounting plate 22 cooperate with the channels 68 on the cover plate 24 to align the cover plate 24 with the mounting plate 22 when the posts 62 of the cover plate 24 are pressed into the U-shaped openings 36 of the mounting plate 22. As shown in FIG. 15, the alignment tabs 52 of the mounting plate 22 extend into the channels 68 of the posts 62 on the cover plate 24. As the cover plate 24 is pressed onto the mounting plate 22, the outward-directed edges 44 on the mounting plate 22 engage the teeth 66 on the posts 62 of the cover plate 24. As a result of the teeth 66 increasing in size from the distal end 80 to the proximal end 78 of the posts 62 and the distance D1 (see FIG. 11) between the posts 62, the cover plate 24 as it is snapped onto the mounting plate 22 is drawn ever tighter onto the mounting plate 22 as the posts 62 are advanced into the U-shaped openings 36 of the mounting plate 22. As a result, after the cover plate 24 is fully snapped onto the mounting plate 22, the cover plate 24 is held very securely to the mounting plate 22 and to the electrical box the mounting plate is secured to.

Figure 16:
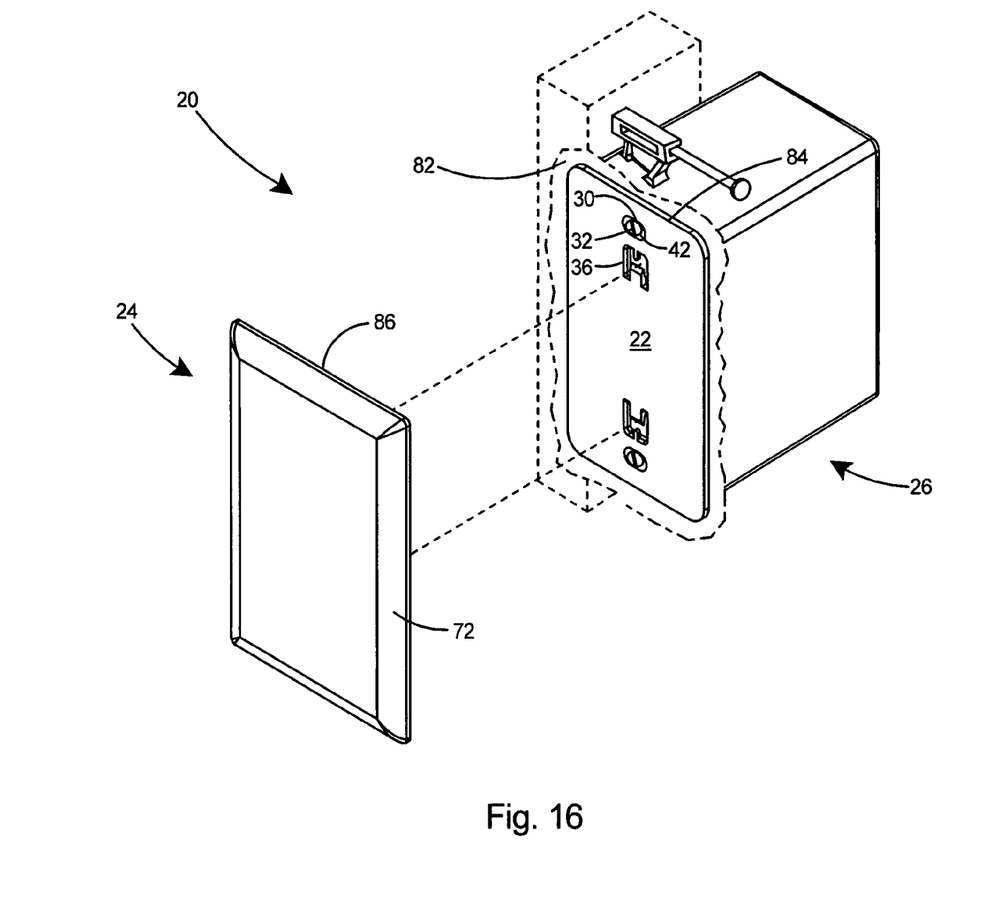
FIG. 16 is a perspective view of the blank cover assembly of the present invention with the mounting plate secured to an unused electrical box and the cover plate in alignment to be secured to the mounting plate.

With reference to FIG. 16, the mounting plate 22 is shown secured to an electrical box 26 and with a cover plate 24 in alignment with the mounting plate 22 to be secured thereto by simply pressing the cover plate 24 onto the mounting plate 22 to form a blank cover assembly 20 according to the present invention. As shown in FIG. 16, the mounting plate 22 includes an outer periphery 84 that is of a larger size than the front outer periphery of the electrical box 26. The mounting plate 22 therefore overlaps the front of the electrical box 26 and extends slightly onto the wall 82 surrounding the electrical box. For those situation in which there is a gap between an empty or unused electrical box 26 and the wall 82, the blank cover assembly 20 of the present invention provides the advantage of masking the gap between the electrical box 26 and the wall 82. The outer periphery 86 of the cover plate 24 is larger than the outer periphery 84 of the mounting plate 22, thereby enabling the cover plate 24 to completely cover or mask the mounting plate 22 when the cover plate 24 is fully installed thereon.

Figure 17:
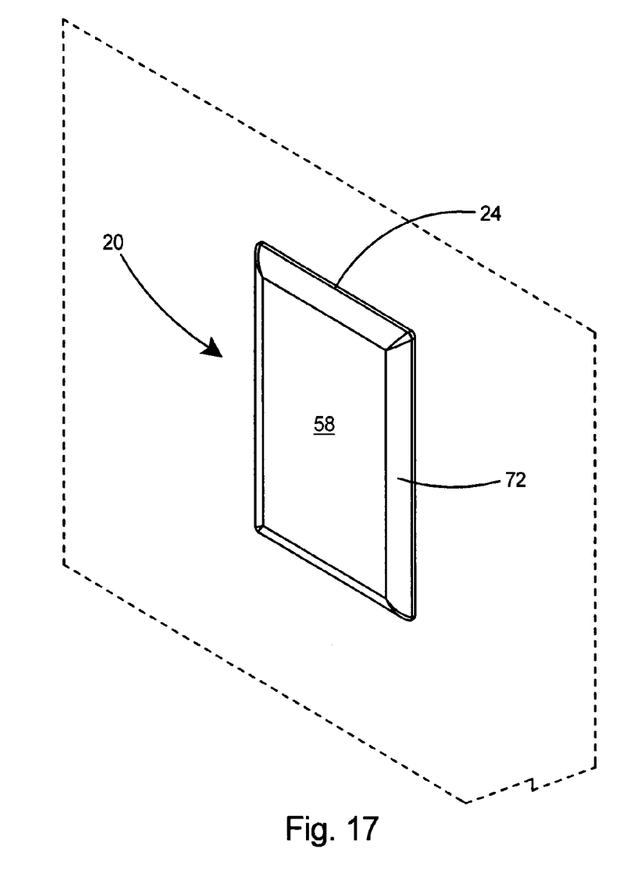
FIG. 17 is a perspective view of the blank cover assembly according to the present invention after being secured to an unused electrical box on a wall.

With reference to FIG. 17, in the completed installation of the blank cover assembly 20 of the present invention, the cover plate 24 completely covers the underlying mounting plate and electrical box and provides an attractive, aesthetically pleasing device for covering an empty or unused electrical box. As shown in FIG. 17, the front surface 58 of the cover plate 24 is completely free of apertures or fasteners. The cover plate 24 is typically constructed of a paintable plastic thereby allowing the cover plate 24 to be painted in a color to match the wall. The resulting blank cover plate 24 results in an unobtrusive electrical box cover that blends in with the wall 82.

As shown in FIG. 1, as a result of the mounting plate 22 being firmly secured to the electrical box 26 with fasteners 32 and the cover plate 24 being firmly secured to the mounting plate 22 by the snap in action of the posts (see FIG. 15) within the U-shaped openings 36 of the mounting plate 22, the blank cover plate 24 is firmly attached to the wall 82. The blank cover plate 24 can be later removed from the electrical box 26 by firmly pulling it therefrom. However, even with the cover plate 24 removed from the electrical box 26, the mounting plate 22 is still secured to the box and prevents any direct access to the electrical box 26 until it is purposely removed therefrom. As shown in FIG. 1, the blank cover assembly 20 of the present invention blanks off an electrical box 26 by use of a simple two-piece assembly, including a mounting plate 22 and a cover plate 24.

Preferably, the mounting plate 22 and the cover plate 24 of the present invention are each molded in one-piece of plastic. The plastic the mounting plate 22 and cover plate 24 are molded from may include polyvinyl chloride, polycarbonate, acrylonitrile-butadiene styrene, or polyethylene.

Having thus described the invention with reference to a preferred embodiment, it is to be understood that the invention is not so limited by the description herein but is defined as follows by the appended claims.

What is claimed is:

1. A blank cover assembly for covering an electrical box with bores therein comprising:
   a mounting plate including a pair of U-shaped openings and a fastening arrangement for securing said mounting plate to said electrical box;
   a cover plate including a front surface and a rear surface;
   two posts extending from said rear surface of said cover plate, each of said posts including inward facing sides with teeth thereon;
   an outward-directed edge on each of said U-shaped openings of said mounting plate for engaging said teeth of said posts on said cover plate; and
   said front surface of said cover plate is free of apertures or fasteners.

2. The blank cover assembly of claim 1 wherein
   said fastening arrangement of said mounting plate includes a pair of slots; and
   said slots match the pattern and spacing of the said bores of said electrical box.

3. The blank cover assembly of claim 2 wherein said slots of said mounting plate are substantially wider than the bores of said electrical box.

4. The blank cover assembly of claim 2 wherein
   said mounting plate includes a front surface and a rear surface;
   said front surface and said rear surface of said mounting plate are planar; and
   said outward-directed edges on each of said U-shaped openings of said mounting plate are angled away from said front surface and said rear surface of said mounting plate.

5. The blank cover assembly of claim 4 including a countersunk periphery in said front surface of said mounting plate surrounding each of said slots.

6. The blank cover assembly of claim 1 wherein
   said U-shaped openings of said mounting plate include a first end and a second end; and
   an alignment tab extending from the first end of said U-shaped openings.

7. The blank cover assembly of claim 6 including
   an open channel on each of said posts of said cover plate; and
   each of said alignment tabs of said mounting plate extend into one of said channels of said posts on said cover plate, said alignment tabs cooperating with said channels to align said cover plate with said mounting plate when said posts of said cover plate are pressed into said U-shaped openings of said mounting plate.

8. The blank cover assembly of claim 1 including
   a reinforcement rib on said rear surface of said mounting plate;
   said reinforcement rib extending vertically between said U-shaped openings.

9. The blank cover assembly of claim 1 wherein
   said posts of said cover plate include a U-shaped cross-section; and said posts are substantially perpendicular to said rear surface of said cover plate.

10. The blank cover assembly of claim 1 wherein
said posts of said cover plate include a proximal end and a distal end; and
said teeth increase in length from said distal end to said proximal end on each of said posts.

11. The blank cover assembly of claim 10 wherein
said teeth on said inward facing sides of said posts face each other; and
the distance between said teeth on said posts decreases from said distal ends to said proximal ends of said posts.

12. The blank cover assembly of claim 1 wherein said cover plate includes an arcuate periphery.

13. The blank cover assembly of claim 12 wherein
said arcuate periphery of said cover plate includes a convex side and a concave side; and
said convex side is on said front surface of said cover plate and said concave side is on said rear surface of said cover plate.

14. The blank cover assembly of claim 1 wherein
said mounting plate includes an outer periphery; and
said outer periphery of said mounting plate is of a larger size than the front outer periphery of said electrical box.

15. The blank cover assembly of claim 1 wherein said mounting plate and said cover plate are each molded in one-piece of plastic.

16. The blank cover assembly of claim 15 wherein said plastic is selected from the group including polyvinyl chloride, polycarbonate, acrylonitrile-butadiene styrene, and polyethylene.

* * * * *